F. S. ELLETT.
DRIVING WHEEL HUB FOR MOTOR CYCLES.
APPLICATION FILED JAN. 9, 1913.

1,189,355.

Patented July 4, 1916.
2 SHEETS—SHEET 1.

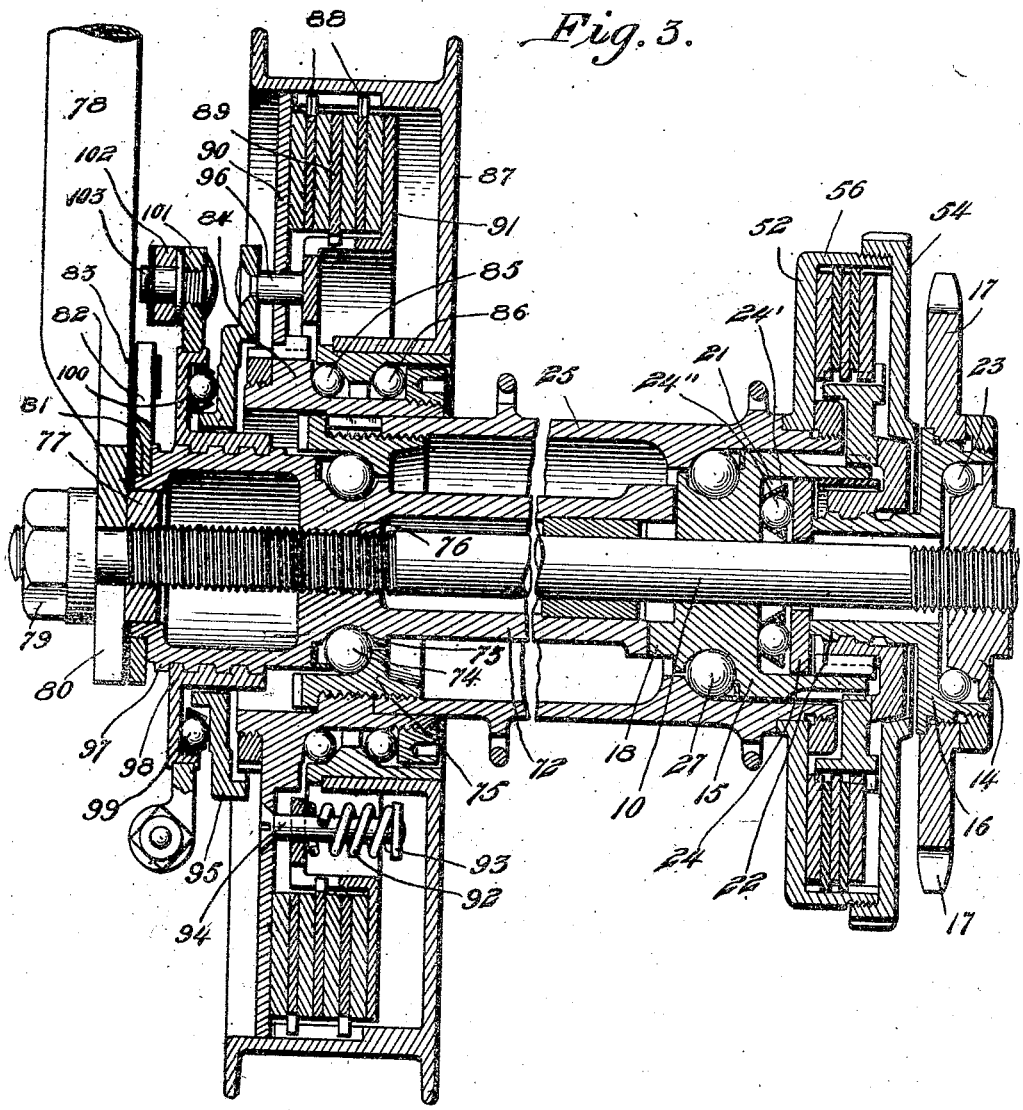

UNITED STATES PATENT OFFICE.

FREDERICK S. ELLETT, OF ELMIRA, NEW YORK.

DRIVING-WHEEL HUB FOR MOTOR-CYCLES.

1,189,355.   Specification of Letters Patent.   Patented July 4, 1916.

Application filed January 9, 1913. Serial No. 741,089.

*To all whom it may concern:*

Be it known that I, FREDERICK S. ELLETT, a citizen of the United States, and resident of Elmira, Chemung county, State of New York, have invented certain new and useful Improvements in Driving-Wheel Hubs for Motor-Cycles, of which the following is a specification.

This invention relates to motor cycles and more particularly to the construction of the driving wheel hub thereof.

The objects of the invention are to provide a driving wheel hub adapted to be equipped with a back pedaling brake at one end and at the other end with a free wheel, which may be locked to the hub barrel by a friction clutch, or an emergency brake which is operable independent of the back pedaling brake.

In motor cycle construction there are conditions which restrict the length of the hub and it has been impracticable in the constructions heretofore employed to combine two brakes or one brake and a free wheel, arranged exteriorly of the hub bearings, where they are readily accessible and may be adjusted or repaired without disturbing the hub bearings.

According to my invention, it is practicable to equip the hub with two brakes, or one brake and a free wheel, by transmitting all of the forces which resist turning of certain parts of the brakes, to the frame at one end of the hub, the non-rotatable parts at the opposite end of the hub being held by means of one or more sleeves arranged on the interior of the hub barrel.

Figure 1:
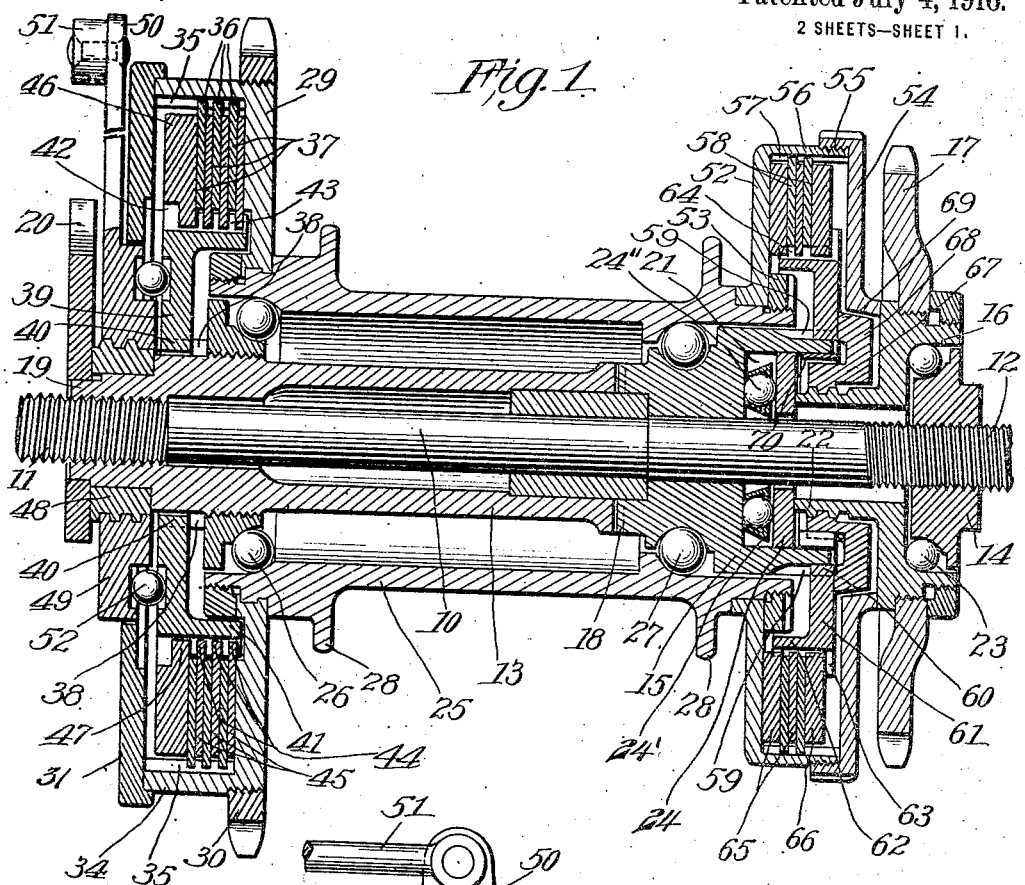
Figure 2:
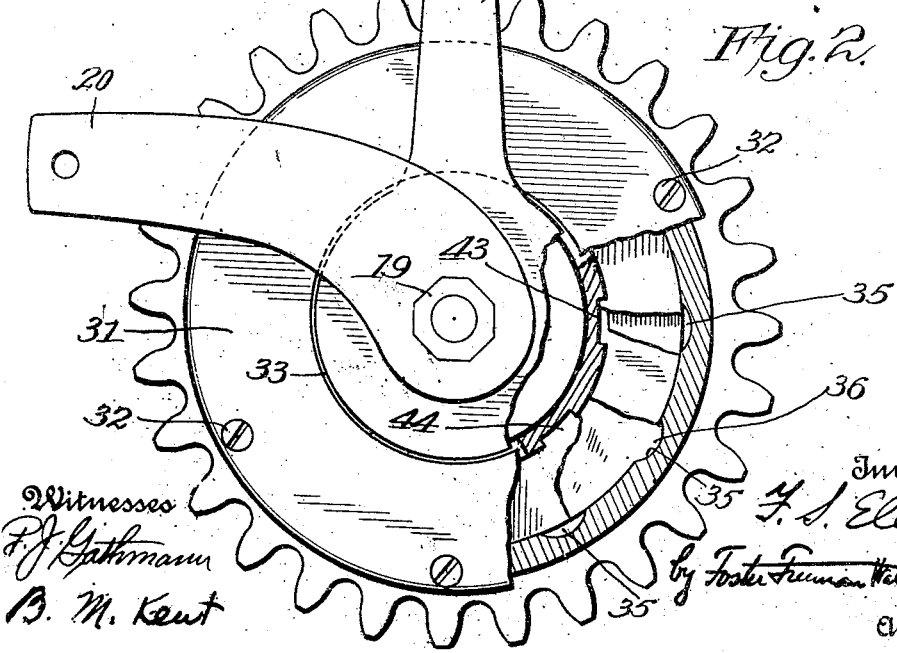

The novel features of the invention will be apparent from the following description, taken in connection with the accompanying drawings, in which, Figure 1 is a longitudinal section through a hub embodying the invention; Fig. 2 is an end view of the same with certain parts broken away; and Fig. 3 is a view similar to Fig. 1 and showing another form of the invention.

Referring to Figs. 1 and 2 of the drawings, 10 indicates an axle member having the threaded ends 11 and 12. A tubular member 13 engages the threaded end 11 and a bearing member 14 engages the end 12. A second tubular member 15 is arranged on the axle 10 and a driving member 16 which has secured thereto a sprocket 17 is rotatably supported on the bearing member 14. The members 13 and 15 are provided with interlocking teeth or projections 18 on their adjacent ends, and the outer end 19 of the member 13 is made angular in form and has fitted thereon an arm 20 which is secured to the frame of the motor cycle and holds the members 13 and 15 against rotation. The outer side of the member 15 is provided with a recess 21 into which extends the exteriorly threaded extension 22 of the driving member 16. The outer side of the driving member 16 is recessed to form a space for the balls 23 which are arranged between the driving member and the bearing member 14 and form a thrust bearing adapted to take up the outward thrust on the driving member. A bearing ring 24 engages the inner end of the extension 22 and between this ring and the member 15 is a cage 24' having arranged therein the balls 24", which transmit thrust from the driving member to the member 15.

A hub barrel 25 is rotatably mounted on the ball bearings 26 and 27 arranged on the members 13 and 15 respectively. The barrel 25 is provided with the flanges 28 to which the spokes of the wheel may be attached, and has secured to one end thereof a cup-shaped member or casing 29 to which is secured a driving sprocket 30 for the wheel, whereby the latter may be driven by the motor. An end plate 31 is secured to the outer edge of the member 29 by screws 32, this plate being provided with a central opening 33 for a purpose to be described hereinafter. Arranged on the interior of the flange 34 of the member 29 are recesses 35 which receive the outward projections 36 on the friction disks 37, whereby the latter are secured to and rotate therewith.

The tubular member 13 is provided with the longitudinal grooves 38 in the outer surface thereof and supports a ring or disk 39 which is provided with projections 40 arranged in the recesses 38, whereby said disk is held against rotation by said member. The disk 39 is provided with an inwardly extending peripheral flange 41 and a radial flange 42 and grooves 43 extending through these flanges and having arranged therein the inward projections 44 on the friction disks 45. A plate 46 is carried by the disk 39 and is provided with a circumferential recess adjacent its inner edge adapted to receive the flange 42. The plate 46 is also provided with inwardly extending lugs or projections 47 which engage the grooves 43 and hold the plate against rotation. An externally threaded collar 48 is secured on the outer end of the member 13 and has arranged thereon an internally threaded ring or nut 49 provided with an operating arm 50 to which may be attached operating means such as the rod 51. The ring 49 is arranged in the central opening 33 in the plate 31 and a ball thrust bearing 52 is provided between the ring and the disk 39.

The parts just described constitute an emergency brake which is actuated by rocking the arm 50. The threads connecting the collar 48 and ring 49 are of steep pitch and when the ring 49 is rocked by means of the arm 50, the disk 39 will be moved in an axial direction. The friction disks 37 and 45 being arranged between the member 29 and the plate 46 will be clamped together and retard the wheel, when the ring 49 is rocked in a direction to move the disk 39 inwardly. When the ring 49 is rocked in the opposite direction, the disks 37 and 45 will become disengaged and permit the wheel to run free.

A member or casing 52 is secured on the opposite end of the barrel 25 in any suitable manner, as by means of the nut 53 and carries an end plate 54 which is secured thereto by the screw threads 55 or in any other suitable manner. The axially extending flange 56 of the member 52 is provided with internal recesses or keyways 57 which receive the outward projections on the friction disks 58 and thus cause these disks to rotate with the wheel.

The member 15 is provided with a series of external longitudinally extending grooves or keyways 59 which receive the inward projections 60 on the ring 61, this ring being somewhat similar in construction to the ring or disk 39 and being provided with the axially extending flange 62 and the radially extending flange 63. The ring 61 is also provided with grooves or keyways 64 which receive the inward projections on the friction disks 65 and the ring or plate 66, the latter engaging the flange 63 and being held thereby against axial movement in an outward direction, on the ring 61. An internally threaded sleeve 67 engages the threaded extension 22 on the driving member 16 and is provided with a radial flange 68 having a circumferential extension 69 which engages the outer side of the ring 61. A spring 70 having one end thereof secured to the sleeve 67 is arranged between the latter and the inner wall of the member 15 and bears against the latter, thus forming a frictional retarding means for the sleeve 67. The periphery of the flange 68 is conical in form and adapted to engage the conical inner surface of the plate 54 to form a frictional driving connection between the sleeve 67 and the hub barrel 25.

The mechanism just described constitutes a coaster or back pedaling brake which is operated as follows: The sprocket 17 is driven by means of a chain from the usual pedals, with which motor cycles are provided and by rotating the member 15 in one direction the sleeve 67 will be moved into engagement with the plate 54 and form a driving connection between the member 16 and the hub barrel 25, whereby the motor cycle may be operated by means of the pedals. When the member 16 is rotated in the opposite direction by back pedaling, the sleeve 67 is caused to move inwardly and carries with it the ring 61, thereby compressing the friction disks between the member 52 and the disk 66. Since the disks 65 are held stationary, the hub barrel will be retarded by the frictional engagement of these disks with the disks 57.

From the above, it will be seen that I have provided a hub construction embodying a coaster brake and an emergency brake which are independently operable and which are also arranged on the exterior of the hub barrel and are readily accessible without disturbing the bearings of the hub barrel. It will also be observed that by the arrangement of the interlocking tubular members 13 and 15, all of the braking strain is carried to one side of the hub and transmitted to the frame through the arm 20. In Fig. 3, I have illustrated another form of the invention in which the hub is provided at one end with a back pedaling brake similar to that shown in Fig. 1, and on the other end of the hub there is rotatably arranged a free wheel adapted to be connected with the hub, to drive the latter, by means of a friction clutch. The parts at the right end of Fig. 3 are substantially the same as those shown at the right hand end of Fig. 1, but at the left end of Fig. 3 the tubular member 72, which corresponds to the member 13 of the construction shown in Fig. 1, is formed with a race 73 for the balls 74 on which is mounted a ring 75, the latter being screwed into the end of the hub barrel 25. The axle member 10 is screwed into the member 72 as indicated at 76, and has arranged thereon a nut or collar 77 which fits on the interior of the member 72 and thus supports the latter. The axle member 10 is secured to a frame member 78 in any preferred manner, as for example, by means of the nut 79, between which and the collar 77, the flattened portion 80 of the frame member is clamped. At its outer end the member 72 is preferably formed with an angular portion 81 on which is mounted an arm 82, this arm being secured to the frame member 78 as shown at 83, and thus holding the member 72 against rotation.

A sleeve 84 is secured to the end of the hub 25 and has arranged thereon sets of balls 85 and 86, on which is mounted the wheel 87. The wheel 87 carries on its interior the friction disks 88 which coöperate with the disk 89 and the plates 90 and 91 to form a driving connection between the wheel and the hub barrel. The plates 90 and 91 are secured on the sleeve 84 but the plate 91 is free to move axially on the sleeve. Springs, which are arranged in a circle and one of which is shown at 92, bear against the plate 91 and abutments 93 carried by screws or pins 94 which are secured in the plate 90, these springs, as will be readily understood, normally tending to move the plates 90 and 91 together to compress the friction disks.

In order to effect an ungripping of the friction disks the plate 91 is moved toward the right by means of a plate 95 which is connected with the plate 91 by pins 96 which pass through suitable openings in the plate 90. The member 72 has arranged on the exterior thereof the screw threads 97 which are engaged by the internally threaded sleeve or nut 98. Balls 99 are arranged between the plate 95 and a radially extending flange 100 on the sleeve 99 and thus provide a thrust bearing between these parts. An actuating arm 101 is secured to the flange 100 and arranged to be actuated by a member 102 which is connected with a pivot 103 carried by the arm.

As thus constructed the springs 92 normally hold the friction disks in gripping engagement so that the wheel 87 is locked to the hub member 25. When it is desired to ungrip the clutch members the sleeve 98 is turned on the member 72 and thus caused to move axially thereon and carry with it the plates 91 and 95, whereby the springs 92 are compressed and the friction disks permitted to become disengaged. By turning the sleeve 98 in the opposite direction the springs 92 will again move the friction disks into gripping engagement and lock the wheel 87 to the hub member.

It will be understood by those skilled in the art that various changes may be made in the details of construction within the scope of the appended claims and since the construction shown and described is merely illustrative of one form in which the invention may be embodied, I do not wish to be limited to these precise details.

Having thus described the invention, what is claimed is:

1. In a motor cycle, the combination of a stationary axle member, a hub barrel, friction members carried by said barrel on the opposite ends thereof, friction members coöperating with said first mentioned friction members and relative to which the first mentioned friction members are adapted to rotate, means extending through said barrel and secured at one end of said axle member and having connection with the second mentioned friction members and adapted to hold the same against rotation, and means at the ends of said axle member for independently effecting the gripping and ungripping of the said coöperating friction members.

2. In a motor cycle, the combination of a stationary axle member, a hub barrel rotatably mounted on opposed bearings at the ends thereof, friction members carried by said barrel on the ends thereof exteriorly of said hub bearings, friction members coöperating with said first mentioned friction members and relative to which the first mentioned friction members are adapted to rotate, means extending through said barrel and secured at one end of said axle member and having connection with the said second mentioned friction members and adapted to hold the same against rotation, means adapted, when actuated one way to effect a gripping of the one non-rotatable friction member with its coöperating friction member to retard said hub barrel, and when actuated in the opposite way to be locked to the hub barrel to drive the latter, and means for effecting a gripping and ungripping of the other coöperating friction members.

3. In a motor cycle, the combination of a stationary axle member, bearings arranged thereon, a hub barrel rotatably mounted on said bearings, friction disks carried by said barrel on the opposite ends thereof exteriorly of said bearing friction disks carried by said stationary member and coöperating with said first mentioned friction disks, and means for independently effecting the gripping and ungripping of the coöperating friction disks.

4. In a motor cycle, the combination of a stationary axle member, a pair of connected members arranged on said axle member, means at one end of said axle member for holding both of said connected members against rotation, a hub barrel rotatably mounted on said connected members, friction members carried by said barrel on the opposite ends thereof, friction members carried by said connected members and coöperating with said first mentioned friction members, and means for independently effecting the gripping and ungripping of the coöperating friction members to retard or release said barrel.

5. In a motor cycle, the combination of a stationary axle member, a pair of interlocking tubular members arranged on said axle member, means at one end of said axle member for holding both of said tubular members against rotation, a hub barrel rotatably mounted on said tubular members, friction disks carried by said barrel on the opposite ends thereof, friction disks carried by said tubular members and coöperating with said first mentioned disks, a driving member for said barrel arranged at the opposite end of said axle member from said means, means actuated by said driving member for effecting the gripping and ungripping of the friction disks at one end of said barrel, and means for effecting the gripping and ungripping of the friction disks at the opposite end of said barrel.

6. In a motor cycle, the combination of a stationary axle member, a pair of connected tubular members arranged on said axle member, means at one end of said axle member for holding both of said tubular members, a driving member arranged at the opposite end of said axle member, friction members carried by said barrel at the opposite ends thereof, friction disks carried by said tubular members and coöperating with said first mentioned disks, means, having screw threaded connection with said driving member, adapted to form a driving connection between the driving member and the hub barrel when the driving member is rotated in one direction and effect the gripping of the friction members at one end of said barrel when the driving member is rotated in the opposite direction, and means for effecting the gripping and ungripping of the friction members at the opposite end of said barrel.

7. In a motor cycle, the combination of an axle member, a pair of connected tubular members, a hub barrel rotatably mounted on said tubular members, a driving member, a thrust bearing for said driving member at one end of said axle member, means adapted to form a driving connection between said driving member and said barrel, and a thrust bearing between said driving member and of one of said tubular members adapted to coöperate with the first mentioned thrust bearing to hold the driving member against axial movement.

8. In a motor cycle, the combination of a hub barrel, a stationary member supporting said barrel, friction members carried by said barrel at the opposite ends thereof, friction members carried by said stationary member and adapted to engage said first mentioned friction members, means at one end of said stationary member adapted to be connected to the frame of the motor cycle to hold said member against rotation, means at the opposite end of said stationary member for driving said barrel and moving the friction members adjacent thereto into gripping engagement, and revoluble cam means for moving the other friction members into gripping engagement.

In testimony whereof I affix my signature in presence of two witnesses.

FREDERICK S. ELLETT.

Witnesses:
A. C. RICE,
D. HELEN CANFIELD.